United States Patent [19]

McLean et al.

[11] 4,307,509
[45] Dec. 29, 1981

[54] METHOD FOR MANUFACTURING A LITHIUM-CHLORINE CELL

[75] Inventors: Robert L. McLean; Wilson Greatbatch, both of Clarence, N.Y.

[73] Assignee: Eleanor & Wilson Greatbatch Foundation, Akron, N.Y.

[21] Appl. No.: 118,797

[22] Filed: Feb. 4, 1980

Related U.S. Application Data

[62] Division of Ser. No. 785,494, Apr. 7, 1977, abandoned.

[51] Int. Cl.³ .............................................. H01M 6/18
[52] U.S. Cl. .................................. 29/623.2; 429/101;
429/181; 429/218
[58] Field of Search ........................... 29/623.2, 623.1;
429/181, 213, 101, 218, 199, 191

[56] References Cited

U.S. PATENT DOCUMENTS

| | | | |
|---|---|---|---|
| 3,660,164 | 5/1972 | Hermann et al. | 429/191 |
| 3,874,929 | 4/1975 | Greatbatch | 429/101 |
| 3,957,533 | 5/1976 | Mead et al. | 429/213 |
| 3,994,747 | 11/1976 | Greatbatch et al. | 429/199 |
| 3,996,066 | 12/1976 | Mead et al. | 429/213 |
| 4,049,890 | 9/1977 | Schneider | 429/181 |
| 4,105,833 | 8/1978 | Greatbatch et al. | 429/181 |
| 4,136,438 | 1/1979 | Mallory | 29/623.2 |

Primary Examiner—Daniel C. Crane
Attorney, Agent, or Firm—Christel, Hean & Linihan

[57] ABSTRACT

A solid electrolyte primary cell comprising a lithium anode, a chlorine cathode and a lithium chloride electrolyte. A solid lithium element operatively contacts the cathode material, and one form of cathode material in a charge transfer complex of an organic donor component material and chlorine. The organic donor component material can be poly-2 vinyl pyridine. Another cathode material can be formed from liquid chlorine. The surface of the lithium anode element which operatively contacts the cathode material can be provided with a coating of an organic electron donor component material. When the lithium anode operatively contacts the chlorine cathode, a solid lithium chloride electrolyte begins to form at the interface and an electrical potential difference exists between conductors operatively connected to the anode and cathode.

5 Claims, 4 Drawing Figures

METHOD FOR MANUFACTURING A LITHIUM-CHLORINE CELL

This is a division, of application Ser. No. 785,494 filed Apr. 7, 1977, now abandoned.

BACKGROUND OF THE INVENTION

This invention relates to the conversion of chemical energy to electrical energy, and more particularly to a solid electrolyte primary cell having a lithium anode, a chlorine cathode and a lithium chloride electrolyte.

In recent times a solid electrolyte primary battery has been developed to provide relatively high voltage and high energy density in a battery which is especially useful for long life, low current drain applications. Lithium is generally recognized as the most satisfactory material for the negative electrode, i.e. the anode on discharge, in a non-aqueous cell. In selecting a material for the positive electrode, i.e. cathode on discharge, it is necessary to consider, among other factors, relative chemical activity and energy density.

SUMMARY OF THE INVENTION

It is, therefore, an object of this invention to provide a new and improved solid electrolyte battery having relatively high voltage and high energy density, and being especially useful for long life, low current drain applications.

It is a further object of this invention to provide a solid electrolyte primary cell having a lithium anode, a chlorine cathode and a lithium chloride electrolyte.

It is a further object of this invention to provide a lithium-chlorine cell which is relatively convenient and economical to manufacture.

The present invention provides a lithium-chlorine cell comprising a lithium anode, a chlorine cathode and a solid lithium chloride electrolyte. In one aspect of the invention the cathode material comprises a charge transfer complex of an organic donor component and chlorine. In another aspect thereof, the cathode material is formed from liquid chlorine. The surface of the lithium anode which operatively contacts the cathode material can be provided with a coating of an organic electron donor component material.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
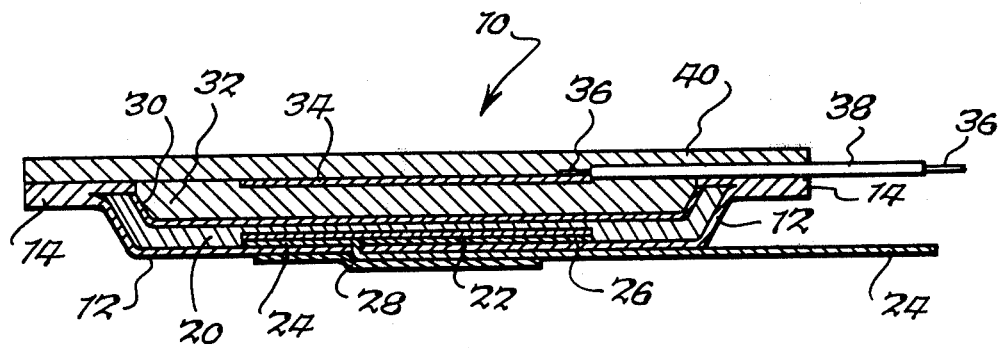
FIG. 1 is a cross-sectional view of a lithium-chlorine cell according to one embodiment the present invention.

In the development of solid electrolyte batteries, lithium is recognized as a very desirable material for the negative electrode, i.e. the anode on discharge, in a non-aqueous cell. The cell of the present invention includes a lithium anode and a chlorine cathode to utilize the desirable characteristics of chlorine, among which are a significant degree of chemical activity, a moderately low molecular weight, and a significant level of energy density.

Referring now to the drawing, a lithium-chlorine cell according to the present invention is generally designated 10 and includes a housing or casing element having a generally cup-shaped base portion 12 and a peripheral rim or flange portion 14. The base portion 12 can be of rectangular or circular configuration, and the casing is of a material which is non-reactive with chlorine. One form of material found to perform satisfactorily is a fluoropolymer material commercially available under the name Halar, a trademark of the Allied Chemical Company. The cell of the present invention includes an anode in the form of a solid lithium element 20 and a current collector element 22 contacting a surface of lithium element 20. The term "solid" is meant to define the lithium element as being in the solid phase. An anode lead 24 connected such as by welding at one end to current collector 22 extends out through an aperture in the housing base portion 12 for making external electrical connection to a load circuit. In forming the anode for the cell of the present invention, current collector 22 is moved into position adjacent the inner surface of the base portion 12 and lead 24 is inserted through the opening and used to draw or pull current collector 22 tightly against the surface of the housing. If desired, an element or button 26 of anode material, i.e. lithium, can be placed between collector 22 and the surface of casing 12 as shown in the drawing. The current collector 22 can comprise No. 12 zirconium mesh having a thickness of about 0.004 inch and lead 24 can be a relatively thin strip of zirconium. Then lithium element 20, initially in plate or sheet form, is placed in casing portion 12 adjacent collector 22. The entire assembly then is positioned in a suitable holding fixture and then force is applied to the exposed surface of lithium element 22 in a manner forcing or extruding it along the inner surface of casing portion 12 and along the inner surface of casing portion 14 so that it conforms to the inner surface of the casing with a resulting shape as shown in the drawing. A seal or patch 28 of suitable material, for example a fluoropolymer materially commercially available from the Dupont Company under the trademark Tefzel, can be placed over the outer surface of the housing around the aperture through which lead 24 extends and sealed in place by a suitable cement such as the cyanoacrylate cement commercially available from Techni-Tool Inc. under the designation Permabond 100. In addition, the exposed surface of lithium element 20 preferably is provided with a coating 30 of an organic electron donor component material, and the nature of coating 30 and its role in the cell of the present invention will be described in further detail presently.

The cell of the present invention further comprises a chlorine cathode including a region of cathode material 32 within the assembly and operatively contacting lithium element 20 and a cathode current collector 34 operatively contacting the cathode material 32. According to a preferred mode of the present invention, the cathode material 32 comprises a charge transfer complex of an organic donor component and chlorine. A preferred organic donor component is polyvinyl pyridine polymer and in particular two vinyl pyridine polymer. Cathode material 32 preferably comprises a mixture of chlorine and poly-two-vinyl pyridine prepared in a manner which will be described in detail presently. A quantity of the cathode material is placed in the assembly in contact with the coated lithium element 20 and in an amount filling the open interior region. A cathode current collector and lead combination is positioned in the assembly and in contact with the cathode material. Cathode current collector 34, which can comprise No. 12 mesh platinum metal, is secured at the periphery such as by welding to one end of a cathode lead 36 which can be a thin strip of platinum iridium alloy, which is enclosed by a sheet of insulating material 38, for example the aforementioned Halar material, which lead 36 extends out from the periphery of the casing for making external electrical connection thereto. Then a casing closure element 40 in the form of a sheet of suitable material is placed over the end of the assembly in contact with the peripheral rim or flange 14 and the components are then heat sealed together. The marginal or peripheral portion of sheet 40 and the rim or flange 14 therefore must be of a material which is heat sealable, and this requirement is satisfied by the aforementioned Halar material. Heat sealing is performed by placing the assembly in a suitable fixture and applying a heated platen to the peripheral end or flange portion at a temperature of about 495° F.±5° F. and at a force of about 60 pounds±10 pounds which have been found suitable to provide an adequate seal. While heat is being applied to the periphery of the assembly, the remainder of the cell assembly can be subjected to low temperature refrigeration or gas to prevent expansion and leakage of the cathode material 32.

The lithium-chlorine cell according to the present invention operates in the following manner. As soon as the chlorine-containing cathode material 32 placed in the assembly operatively contacts lithium element 20, a solid lithium-chlorine electrolyte begins to form at the interface, and an electrical potential difference will exist between the anode and cathode electrical leads 24 and 36, respectively, when the current collectors are in operative position. The mechanism by which the foregoing is accomplished is believed to include migration of lithium ions through the electrolyte whereby lithium is the ionic species in the cell.

The following illustrative example explains in further detail a method of making the cathode material 32 and the operation of the cell.

EXAMPLE I

One gram of poly-two-vinyl pyridine was placed in a 200 ml. pressure reactor, and the sealed vessel was pressurized with chlorine gas to 85 p.s.i.g., the tank pressure being 85 p.s.i.g. maximum. The reaction was allowed to proceed for 20.75 hours, and then the excess chlorine was vented and the vessel was opened. About 50 to 75 percent of the solid material in the vessel had a purplish black color, but the physical condition of the material otherwise resembled that of the polymer material initially placed in the vessel. The crude weight of the reaction product was 2.0 grams, and therefore during the reaction 1.0 gram of chlorine had been consumed or absorbed. The mole ratio of $Cl_2$ to poly-2-vinyl pyridine monomer was $0.0141/0.0095 = 1.48$. The dark reaction product was bottled loosely and allowed to stand over a weekend. Then 20 drops of propylene glycol were introduced to the product and the bottle or container was tightly stoppered. After about one hour the entire mass turned black and was observed to be sticky and self-adhering, i.e. in a somewhat agglutinated condition. The mass was placed in a cell assembly similar to that illustrated in FIG. 1 wherein the lithium anode was unscraped but coated with organic electron donor component material as described in connection with FIG. 1. Instead of heat sealing closure element 40 and flange 14 as in the assembly of FIG. 1, a current collector screen and flat plastic sheet were used to close the cell which was held together by mere finger pressure. Initially a cell voltage of 3.0 volts open circuit was measured, and this was observed to build rapidly. After a few minutes, the measured open circuit voltage was greater than 3.2 volts and observed to be climbing. Then the cell was taped shut all around and measured voltage was 3.64 volts and climbing. The cell was preserved for further observation in a sealed vessel containing a desiccant or similar material to maintain a dry atmosphere.

Referring again to the cell of FIG. 1, the material of coating 30 on lithium element 20 is an organic electron donor material of the group of organic compounds known as charge transfer complex donors. The material of the coating can be the organic donor used in preparing the charge transfer complex of the cathode material 32, but other materials can be employed. A preferred material for the coating is polyvinyl pyridine and it is applied to the exposed surface of lithium element 20 in the following manner. A solution of poly-2-vinyl pyridine polymer in anhydrous benzene or other suitable solvent is prepared. The poly-2-vinyl pyridine is readily commercially available. The solution is prepared with 2-vinyl-pyridine present in the range from about 10% to about 20% by weight with a strength of about 14% by weight of 2-vinyl-pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10% the resulting coating can be undesirably too thin and when the solution is prepared at a strength greater than about 20% the material becomes difficult to apply. The solution is applied to the exposed surface of each lithium plate in a suitable manner, for example simply by application with a brush and this preferably is done in a dry room having an atmosphere wherein the relative humidity is less than one percent. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours.

Figures 2, 3:
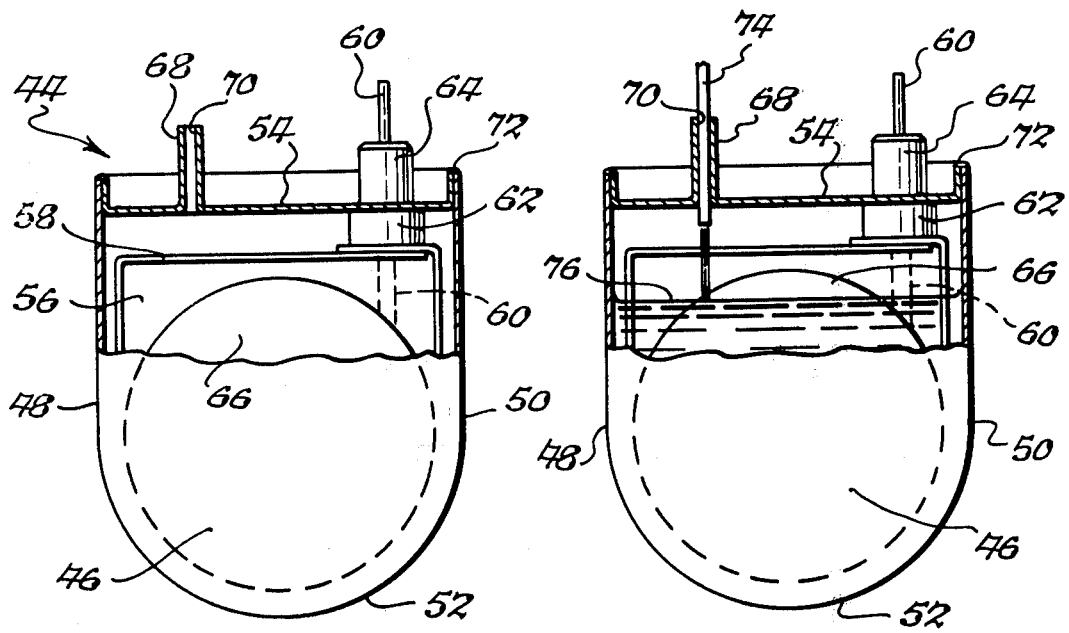
FIG. 2 is a side elevational view with parts removed of a cell according to another embodiment of the present invention at one stage of assembly.
FIG. 3 illustrates the cell of FIG. 2 at another stage of assembly.
Figure 4:
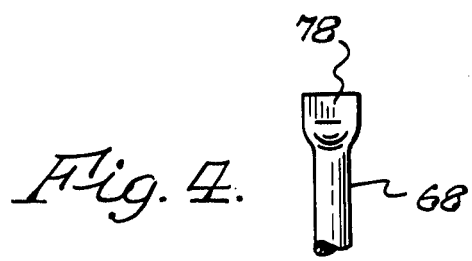
FIG. 4 is a fragmentary elevational view of one means of closing the filling element in the cell of FIGS. 2 and 3.

FIGS. 2-4 illustrate a lithium-chlorine cell according to the present invention wherein the cathode material is formed from liquid chlorine. FIG. 2 illustrates the cell at a stage of assembly prior to introduction of chlorine. The cell comprises a casing 44, preferably of electrically conducting material such as stainless steel, having spaced-apart side walls, one of which is designated 46, which are joined by spaced apart end walls 48 and 50. Casing 44, being of electrically conducting material, serves as a cathode current collector. The casing includes a curved bottom portion 52, and the opposite, open end of casing 44 is sealed closed by a lid member 54 fitted therein which also is of metal such as stainless steel. A lithium anode means in casing 44 comprises a pair of plate-like lithium elements, one plate 56 being shown in FIG. 2, sandwiched together against a current collector element (not shown) and surrounded snugly by a sealing strap or frame element 58 at the peripheral edges thereof. Strap 58 is of material which is non-reactive with chlorine, for example a fluoropolymer material commercially available under the name Halar, a trademark of Allied Chemical Company.

An anode electrical conductor 60 which is joined at one end to the current collector (not shown) extends out from the assembly of lithium plates through aligned openings in the overlapping ends of strap 58. Conductor 60 is sealed from the remainder of the cell by means including an insulator element 62 which surrounds conductor 60 and has a first portion (not shown) which is sandwiched between the lithium plates and a second portion which is cylindrical and located between the lithium plates and lid 54 when the cell is completed. Insulator 62 is of a material which in addition to being a non-conductor of electricity also is non-reactive with chlorine, for example the afore-mentioned Halar material. A ferrule 64 of metal such as stainless steel encloses a further portion of conductor 60. Ferrule 64 can be threaded at one end (not shown) and is connected into insulator 62, the inner surface thereof (not shown) which also can be threaded. Ferrule 64 is of generally hollow cylindrical shape, and the region between ferrule 64 and conductor 60 can be filled by a glass seal formed therein to provide a metal-glass hermetic seal. The exposed end of conductor 60 outwardly of casing 44 provides external electrical connection to the cell.

The exposed or operative surfaces of the anode lithium plates are coated with an organic electron donor material as previously described. In some instances it may be advantageous to introduce an organic electron donor material into operative relationship with the lithium anode prior to introducing chlorine. An organic electron donor material found to perform satisfactorily is polyvinyl pyridine polymer, in particular two-vinyl pyridine polymer, and as shown in FIG. 2 the material is in the form of a pellet or wafer, one of which is designated 66 in FIG. 2. It is preferred to include two such pellets or wafers in a cell, one adjacent each exposed face of the lithium anode. Alternatively, the organic electron donor material can be introduced in the form of crystals placed in the cell casing in a measured quantity adjacent both sides of the lithium anode.

After the anode assembly is placed in casing 44 and the organic electron donor material, if used, is introduced, the casing is sealed by means of lid member 54. Lid member 54 is provided with a filling element 68 in the form of a metal tube fixed to lid member 54 and having a passage 70 therethrough. Tube 68 preferably is a separate element which is fitted at one end into an aperture provided through lid 54 and welded thereto. Alternatively, the lid 54 and tube 68 could be formed integrally from a single piece of metal. Lid 54 is fitted into the open end of casing 44 with an aperture in lid 54 receiving the ferrule 64 in a tight-fitting manner whereupon the lid is sealed to the casing by welding at 72 around the peripheral edge thereof to the corresponding edge of the casing.

The cell is completed by introducing chlorine through passage 70 in the filling element 68 into the interior of the casing into operative relationship with the lithium anode. In particular, a small diameter tube or conduit 74 leading from a supply of chlorine (not shown) is placed in fluid communication with passage 70, and in the present instance tube 74 is inserted into and along within element 68 so that the open end of the tube 74 is within the casing 44. Liquid chlorine in a measured quantity or volume is conveyed from the supply through the tube 74 into the casing 44, the level of chlorine at this illustrative stage of assembly being designated 76 in FIG. 3. Tube 74 can have an outer diameter such that it fits relatively snugly within the passage 70 to prevent or minimize escape of chlorine gas from within casing 44 to the outside. If desired, the tube 74 can carry a suitable seal for engaging the end of filling element 68 or the entire filling assembly and cell can be cooled below the vapor point of chlorine. The amount of liquid chlorine introduced to casing 44 generally will be sufficient to at least cover the exposed surfaces of the lithium plates, and often will be filled to a level above the anode assembly and below the lid 54. After the predetermined amount of chlorine is introduced to casing 44, conduit 74 is removed from the filling element 68 and the passage 70 is sealed closed. As shown in FIG. 4, the outer end of tube 68 is pinched or otherwise mechanically formed into a flattened, clamped portion 78 which then can be further sealed by welding. Other means for sealing the passage 70 can be employed. The metal tube 68 preferably of nickel also serves as an electrical terminal inasmuch as the casing 44 serves as a cathode current collector.

In situations where an organic electron donor material is introduced prior to the chlorine, i.e. the pellets 66 of poly-2-vinyl pyridine, the chlorine introduced to the casing reacts with the organic electron material, and the reaction product is a charge transfer complex of an organic electron donor component, i.e. poly-2-vinyl pyridine, and chlorine. Thus, chlorine-containing cathode material is formed in casing 44 upon introduction or injection of chlorine to the interior thereof.

The lithium-chlorine cell shown in FIGS. 2–4 operates in the following manner. As soon as the chlorine cathode material operatively contacts the lithium anode elements, a solid lithium-chlorine electrolyte begins to form at the interface, and an electrical potential difference will exist between anode lead 60 and cathode terminal 68 when the current collectors are in operative position. The mechanism by which the foregoing is accomplished is believed to include migration of lithium ions through the electrolyte whereby lithium is the ionic species in the cell.

The following illustrative example explains in further detail the lithium-chlorine cell of the present invention wherein the cathode material is formed from liquid chlorine.

EXAMPLE II

A cell assembly similar to that shown in FIGS. 2 and 3 including a stainless steel casing and lithium anode coated with poly-2-vinyl pyridine was cooled to a temperature of about $-70°$ C. by immersing the cell assembly in a bath of dry ice and acetone. Gaseous chlorine was bubbled into the cell enclosure by means of a supply tube inserted into the hollow metal inlet tube leading from the casing lid similar to the metal tube or filling element 68 shown in FIGS. 2 and 3. In particular, a very fine syringe needle was attached to one end of a length of small bore plastic tubing, the other end of which was connected to the outlet of a chlorine gas cylinder or similar supply. The needle was inserted in the cell metal inlet tube, and with the cell cooled in the dry ice-acetone bath, the chlorine gas was slowly introduced. The gas condensed into liquid chlorine in the cell and this is continued for a time sufficient to provide an adequate volume of liquid chlorine, usually an amount which will cover the lithium anode. Thereafter, the cell casing was cooled further by pouring liquid nitrogen over it. The supply tube was removed and the casing metal inlet tube was welded shut thereby completely sealing the casing. The difference between 12.0 grams gross weight and 11.7 grams tare weight indicated about 0.3 gram chlorine in the cell. The cell open circuit voltage initially was observed to be 2.973 volts which then fell to 2.90 volts and thereupon rose to 3.1 volts in one hour. In the foregoing method, using the dry ice-acetone system enables the cell itself to serve as the condensing unit and avoids any freezing in the cell metal inlet tube.

It is therefore apparent that the present invention accomplishes its intended objects. While several embodiments of the present invention are described in detail, this is for purpose of illustration, not limitation.

We claim:

1. A method of making a lithium-chlorine cell comprising the steps of:
   a. providing a cell assembly comprising lithium anode means within a casing;
   b. cooling said assembly to a temperature sufficiently low to condense chlorine gas;
   c. introducing chlorine gas to said cooled casing to provide liquid chlorine in said casing in operative relationship with said lithium anode means to form a solid lithium chloride electrolyte in situ between said liquid and said lithium anode means; and
   d. sealing said casing.

2. A method according to claim 1, wherein said step of cooling said assembly includes placing said assembly in a bath of dry ice and acetone.

3. A method according to claim 1, wherein said casing is provided with a filling element having a passage therethrough, said chlorine gas being introduced through said filling element passage and said passage being closed after introduction of chlorine.

4. A method according to claim 1, further including the step of cooling said assembly further after introduction of chlorine.

5. A method according to claim 4, wherein said step of further cooling includes applying liquid nitrogen to said assembly.

* * * * *